Aug. 29, 1961   F. NALLINGER ET AL   2,998,275
DOOR LOCK FOR MOTOR VEHICLES
Filed Sept. 24, 1957   3 Sheets-Sheet 3
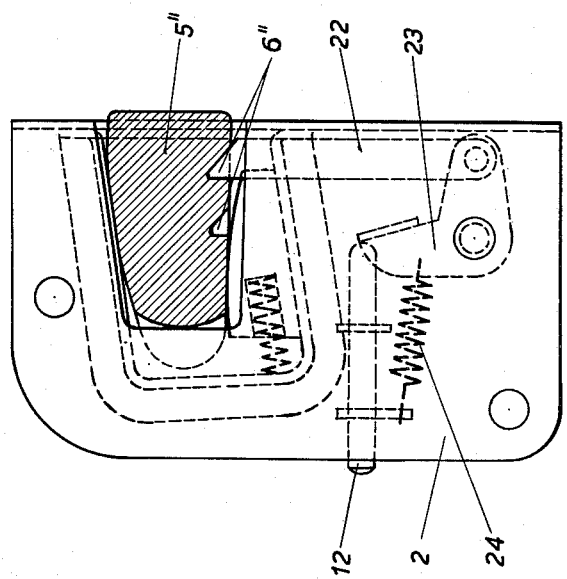
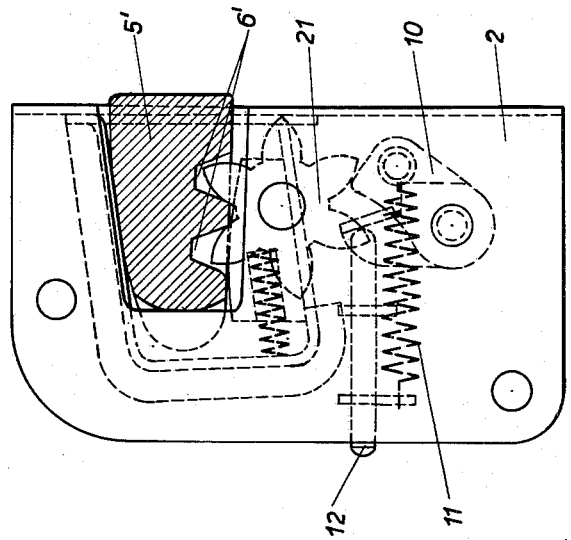
INVENTORS
FRIEDRICH NALLINGER
ERNST NOCKEMANN
BY Dicke and Craig
ATTORNEYS.

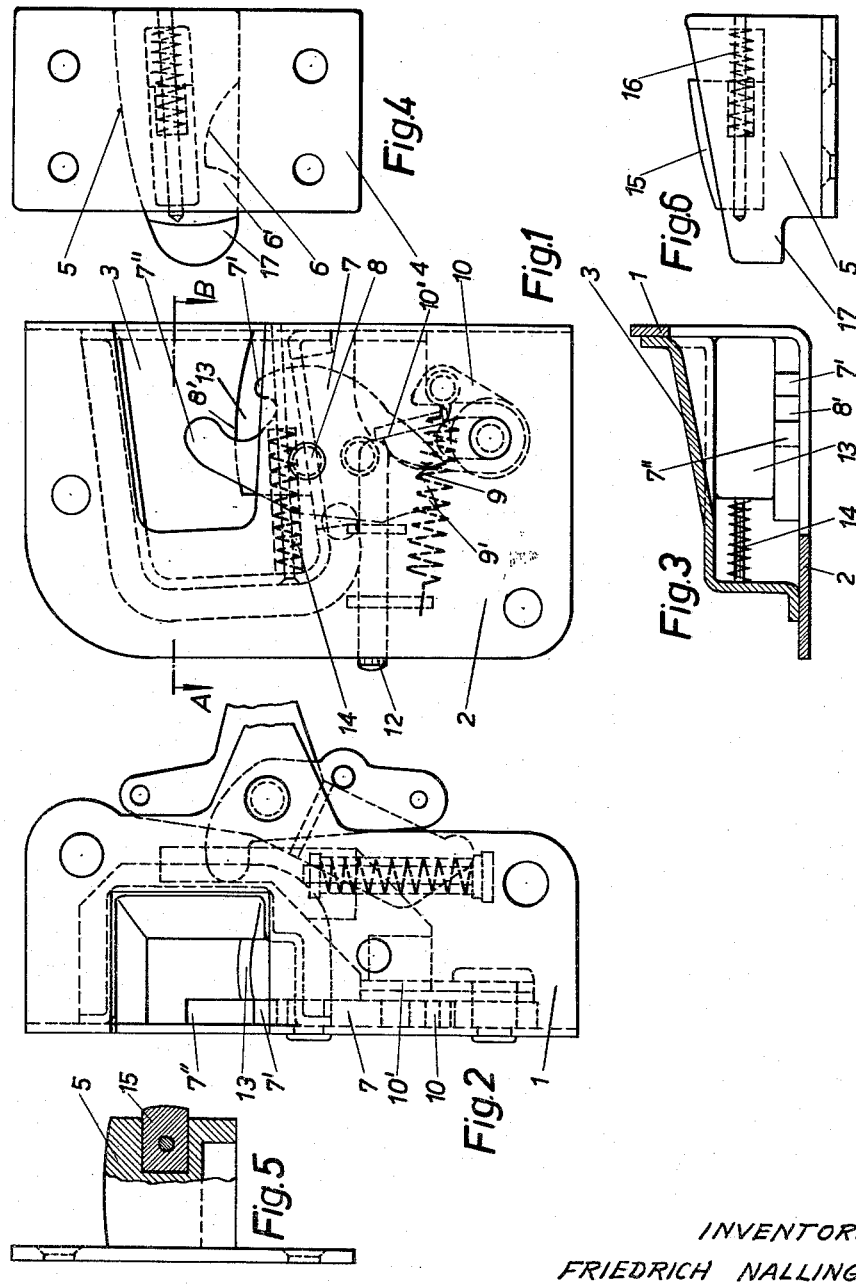

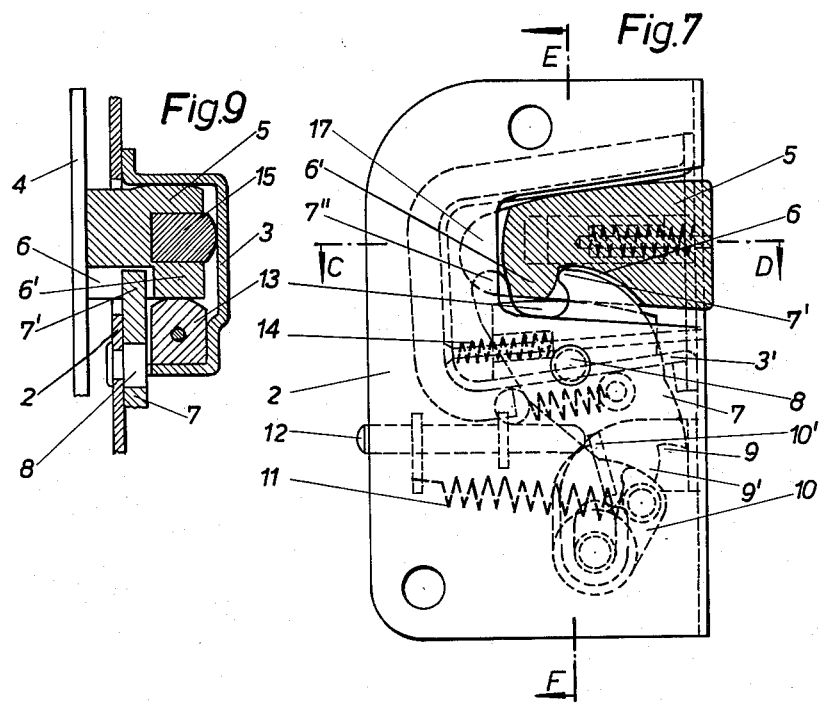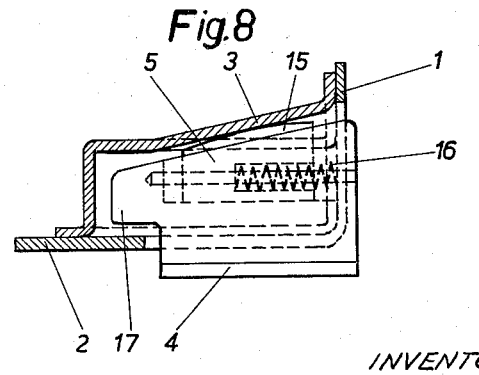

Patented Aug. 29, 1961

2,998,275
DOOR LOCK FOR MOTOR VEHICLES
Friedrich Nallinger, Stuttgart, and Ernst Nockemann, Wuppertal-Ronsdorf, Germany, assignors to Daimler-Benz Aktiengesellschaft, Stuttgart-Unterturkheim, Germany
Filed Sept. 24, 1957, Ser. No. 685,969
Claims priority, application Germany Sept. 24, 1956
4 Claims. (Cl. 292—216)

The present invention relates to a door lock which is especially adapted for the doors of motor vehicles in which, when the door is being closed, a locking bolt or wedge which is mounted on the door frame enters into a corresponding lock housing and is subsequently locked within such housing.

Although door locks of this kind are known and have been used for some time, they all have the disadvantage that they are a source of noise since the design and operation of these door locks require a certain amount of play between the wedgelike bolt and the lock housing which, due to the vibration and shaking of the vehicle, especially when being driven on a rough road, results in a movement and rattling noise of the door.

Numerous attempts have been made to overcome this disadvantage by providing the locking bolt or locking wedge with a cushion of resilient rubber. Although this slightly reduced the movement of the bolt or wedge relative to the lock housing and thus also the movement of the door within its frame, it never prevented such movement entirely. This would be possible only if the locking bolt or wedge could be rigidly connected to the lock housing so as to be immovable relative thereto. Such rigid locking action could, however, not be attained with the door locks of known design because of the inaccuracies in dimensions necessarily occurring in the series or mass production of car bodies.

Furthermore, the vibrations of a vehicle when driving over rough roads also cause minor distortions of the door frame which, in turn, result in movements of the door within its frame and of the locking elements of the door relative to each other. The relatively movable parts will then knock against each other or slide along each other and thereby cause rattling, squeaking, and clicking noises. Toward the inside of the vehicle the doors are generally sealed by rubber strips. If such a door then moves within its frame, it will also slide along the rubber strips and thereby produce the well-known noises which are peculiar to rubber and plastics. The combination of these two types of noises is considerably amplified by the car body which works like a large sound board.

It is an object of the present invention to provide a door lock which insures a rigid, unyielding connection between the door and the door frame despite the usual inaccuracies in dimensions caused by the mass production and assembly of motor vehicles.

This object is attained according to the invention by providing the wedge-shaped bolt which is mounted on the door frame and the lock housing which is mounted on the door and adapted to receive the bolt with slide members which are pressed forwardly by springs and are either wedge-shaped or inclined relative to their direction of movement. These two slide members are adapted to move within two intersecting planes and preferably in a horizontal plane and in a vertical plane, respectively. Thus, for example, one slide member is mounted within the lock housing and moves vertically to the plane of the pivotal movement of the door when the door is being closed while the other slide member is preferably mounted within the bolt itself and moves within the plane of the pivotal movement of the door. When the door is being closed, the two slide members will be pushed back against the action of their springs so that by means of the slide members the locking bolt and the lock housing engage solidly with each other so as to be immovable relative to each other in every direction. If, due to the vibrations caused by driving along a rough road, the car body becomes slightly distorted or deformed and the door is thereby loosened within the door frame so that the bolt and lock housing have play relative to each other, the slide members automatically move forwardly, wedging themselves between the bolt and lock housing and thereby overcome such play. However, because of their small inclination and the action of the springs pressing them forwardly, the slide members cannot return to their original positions when the forces which distort the door frame cease to exist, and consequently the door remains tightly wedged in its door frame by means of its lock members. This wedging action continues progressively during several successive vibrations of the car body until no further play can be produced between the lock members on the door and door frame by any subsequent vibrations.

A further feature of the invention resides in making the spring-actuated slide members slightly crowned both in their longitudinal and transverse directions in order to increase the wedging action of the door within the door frames. This prevents the slide members from engaging at their edges with the opposite contact surface and insures that their contact or sliding points will always lie directly on their slide surface.

The locking action upon the bolt within the lock housing may be effected by a suitable locking element of a known type, for example, by a spring latch, a rotatable gear wheel, or a pivotable latch with a feeler portion thereon which projects into the lock housing and is engaged by the bolt when the door is being closed so as to pivot the latch into locking engagement with the bolt.

Another feature of the invention consists in mounting the respective mentioned locking element which engages into the locking bolt or latch at the inside of the lock housing underneath the side plate thereof and in also designing the locking bolt so that the latch engages into a recess within the bolt. Such arrangement will also secure the door to the door frame in a direction vertical to its pivoting direction and prevent it from springing open of its own accord during an accident. Still another feature of the invention for attaining the last-mentioned object consists in the provision of a projection on the front end of the locking bolt which engages into a corresponding inner extension of the lock housing so that, when the door is fully closed and the locking bolt fully within the lock housing, this projecting front end of the bolt will be encased by the side plate of the lock housing and prevented from coming out of the lock housing, and thus prevent the car door from springing open during an accident.

Further objects, features, and advantages of the present invention will be apparent from the following detailed description thereof, particularly when read with reference to the accompanying drawings, in which—

FIG. 1 shows a front view of a lock according to a first embodiment of the invention;

FIG. 2 shows a side view of the lock according to FIG. 1;

FIG. 3 shows a cross section taken along line A—B of FIG. 1;

FIG. 4 shows a front view of the wedge-shaped locking bolt;

FIG. 5 shows a side view of the locking bolt;

FIG. 6 illustrates a top view of the locking bolt;

FIG. 7 shows a front view of the lock and locking bolt in locking engagement with each other;

FIG. 8 illustrates a cross section taken along line C—D of FIG. 7;

FIG. 9 shows a cross section taken along line E—F of FIG. 7;

FIG. 10 shows a view similar to FIG. 7, but with the invention being applied to a different type of lock; while FIG. 11 shows a view similar to FIG. 7 but with the invention applied to still another type of lock.

Referring to the drawings, and first particularly to FIGS. 1 to 9, the face plate 1 and the side plate 2 of the lock case which together may form a single element carry the bolt housing 3 which is made of steel plate and is securely welded or riveted to plates 1 and 2. When the car door is being closed, bolt housing 3 is adapted to receive a conical locking bolt 5 which is mounted on a base plate 4 which is secured to the door frame, for example, by screws. Bolt 5 then enters into bolt housing 3 and is arrested therein by a lock member which engages into a recess 6 in bolt 5. This lock member may be of different shapes and designs and may according to the embodiment illustrated in FIGS. 1 to 9 consist of a latch 7 which is pivotably mounted on plate 2 by a pin 8 and has at its right upper side, as illustrated in FIGS. 1 and 7, a projecting catch 7′ and at its left upper side a feeler projection 7″ which are separated by a recess 8′. Since feeler 7″ projects into bolt housing 3, bolt 5 when entering housing 3 hits upon feeler 7″ and thereby pivots latch 7 about pin 8, whereby catch 7′ will at the same time swing upwardly and enter into recess 6 in bolt 5, while the nose 6′ formed between the front edge of bolt 5 and the left edge of recess 6 enters into recess 8′ and engages at both sides with the left edge of catch 7′ and the right edge of feeler 7″. Recess 6 is preferably made in the form of a slot in bolt 5 so that the side walls of this slot also retain catch 7′. Bolt 5 and latch 7 are thus in interlocking engagement with each other. During the first part of the closing movement of the door, the lower right side of the pivoting latch 7 engages with a pawl 10 and turns the same from its end position as shown in FIG. 1 in a clockwise direction against the action of a spring 11 until it engages in the intermediate or preliminary locking position in a tooth gap 9 in latch 7, while during the final closing movement pawl 10 will again be pivoted until it snaps over a second tooth 9′ and engages against the back thereof; as illustrated in FIG. 7. Thus, latch 7 will be securely arrested both in the intermediate and full locking positions. For unlocking latch 7, a bolt 12 or any suitable other means may be provided which when depressed into the lock case acts upon an arm 10′ on pawl 10 and pivots the latter out of engagement with latch 7 so that the latter will be released, allowing the door to be opened.

FIGS. 10 and 11 illustrate two other types of locks to which the invention may be applied. In both cases, the locking bolt 5′ or 5″ is provided with two recesses 6′ or 6″, respectively, for the intermediate and full locking positions. In FIG. 10, latch 7 as shown in the first embodiment is replaced by a gear wheel 21, the teeth of which correspond in function to catch 7′ and feeler 7″, and to teeth 9 and 9′ which are adapted to engage with pawl 10. In FIG. 11, when the car door is being closed, a lock bar 22 which is pivotably connected to an arm 22 of a bell crank 23 will, under the resilient action of a spring 24 engage first into one and then into the other recess 6″ in bolt 5″. For releasing bolt 5″ to permit the door to be opened, bolt 12 may be depressed so as to pivot bell crank 23 in a clockwise direction, thereby withdrawing lock bar 22 from recess 6″.

In all three embodiments as illustrated in FIGS. 1 to 9, 10 and 11, and as may best be seen in FIG. 9, bolt housing 3 contains at its lower side and laterally adjacent to latch 7 a wedge-shaped slide member 13 which is pressed forwardly by a spring 14. When the car door is being closed and bolt 5 enters into bolt housing 3, slide member 13 is pushed backwardly against the action of spring 14 by the sliding engagement of its upper inclined or cammed surface with the likewise inclined lower surface of bolt 5 and in accordance with the degree of inclination of these surfaces relative to each other. The sliding action of slide member 13 against the action of spring 14 may also be attained by inclining the guiding surface which is formed by the lower wall 3′ of bolt housing 3. In this event slide member 13 may be made less wedge-shaped or, except for its upper camlike surface, be substantially square. It will at any time be in tight engagement with bolt 5, holding the same immovably within bolt housing 3, and prevent any play between the bolt and the walls of housing 3 regardless of how strong the vibrations or jarring of the car may be until it is unlocked by hand.

In order to wedge and lock the locking bolt within bolt housing 3 so as to be free of any play also in the transverse direction, bolt 5 is provided with a longitudinally extending recess as shown particularly in FIGS. 6 and 9 in which a second slide member 15 is slidably mounted against the action of a spring 16 which tends to press slide member 15 forwardly. The outer shape and the action of slide member 15 is similar to those of slide member 13. In the closed position of the door, the slide member 15 wedges between the bolt and the inclined surface of the bolt housing 3 which appears in section in FIGURE 3. By their combined action, both slide members 13 and 15 wedge and lock the locking bolt 5 tightly against the walls of bolt housing 3 and prevent any movement, vibration, or play thereof relative to housing 3. The sliding surfaces of both slide members 13 and 15 which slidably engage with locking bolt 5 and the inner wall of bolt housing 3 are preferably slightly rounded or crowned to insure a proper sliding and wedging action even if the respective lock members should have become slightly deformed.

Since latch 7 and its catch 7′ which is engaged in recess 6 in locking bolt 5 are disposed at the inside of the lock behind side plate 2 and since recess 6 is closed toward the front of the bolt and may also be in the form of a slot, the door will also be securely locked to the door frame in a direction vertical to the plane of its pivoting movement and thus be prevented from opening of its own accord during an accident. Such opening of the door will also be prevented by a forward projection 17 on the front end of bolt 5 which, when the door is closed, is covered by side plate 2, as may be seen particularly in FIGS. 7 and 8.

It will thus be evident that slide member 13, which is slidably mounted within bolt housing 3, and slide member 15, which is slidably mounted within bolt 5, support the latter in two different directions so that any movement of the bolt within bolt housing 3 will be prevented.

Although our invention has been illustrated and described with reference to the preferred embodiments thereof, we wish to have it understood that it is in no way limited to the details of such embodiments, but is capable of numerous modifications within the scope of the appended claims. Thus, for example, as indicated by FIGS. 10 and 11, the invention is also applicable to other types of locks than those specifically described and illustrated. Also, the wedging slide members according to the invention may be of other shapes and designs as shown and described as long as it is their purpose to produce the locking action which forms the principal feature of the invention.

Having thus fully disclosed our invention, what we claim is:

1. A door lock comprising a rigid substantially conical locking bolt adapted to be rigidly secured to a door and having a recess therein, a lock casing adapted to be rigidly secured to a door frame, a rigid bolt housing secured to said lock casing and having an opening adapted to receive said locking bolt when said door is being closed, locking means mounted on said lock casing and adapted to enter into said bolt housing and into said recess in said bolt so as to interengage with said bolt when said door is closed so as to lock said bolt within said bolt housing, and wedging means acting between said bolt and said bolt housing when the elements are in their engaged positions to prevent relative movement therebetween in both vertical and horizontal directions, each direction being perpendicular to the door-closing direction of movement of the bolt into the bolt housing, said wedging means including a first and a second rigid slide member, said first slide member being slidably guided within said bolt housing, said bolt having a recess therein extending longitudinally thereof, said second slide member being slidably guided within said recess in said bolt and acting upon a wall of said bolt housing, each of said slide members having a surface longitudinally inclined relative to a surface on the bolt and resilient means acting upon each of said slide members and tending to press each said slide member in a direction toward said opening so as to unyieldingly wedge said locking bolt by means of said inclined surfaces into a tight engagement with said bolt housing, said two slide members acting upon said bolt within two different planes extending substantially at right angles to each other to thereby prevent said relative movement in both the vertical and horizontal directions between said bolt and bolt housing, said slide members being disposed within said bolt housing and adjacent said locking means when said locking means is in the locked position.

2. A door lock as defined in claim 1, further comprising a projection on the front end of said locking bolt, said projection being disposed behind a solid portion of said lock casing when said door is closed so as to secure said bolt within said bolt housing also in the direction of the plane of said door.

3. A door lock as defined in claim 1, wherein said bolt housing has a longitudinally-inclined surface, said second slide member being adapted to engage with said inclined surface of said bolt housing for unyieldingly wedging said bolt into rigid engagement with said bolt housing.

4. A door lock comprising a pair of rigid lock elements adapted to interengage with each other and one adapted to be rigidly secured to a door and the other to a door frame, one of said lock elements comprising a rigid locking bolt and the other lock element comprising a lock casing, a bolt housing rigidly secured to said lock casing and having an opening adapted to receive said locking bolt when said door is being closed, locking means mounted on said lock casing and adapted to enter into said bolt housing and to interengage with said locking bolt when said door is closed so as to lock said bolt within said bolt housing, and wedging means acting between said bolt and said bolt housing once the elements are in their engaged positions to prevent relative movement therebetween in both vertical and horizontal directions, each direction being perpendicular to the door-closing direction of movement of the bolt into the bolt housing, said wedging means including a first and a second rigid slide member slidably mounted within said lock, said first slide member being slidably guided within said bolt housing, said bolt having a recess therein extending longitudinally thereof, said second slide member being slidably guided within said recess in said bolt and acting upon a wall of said bolt housing, each of said slide members having a longitudinally-inclined surface, and resilient means acting upon each of said slide members and tending to press each said slide member in a direction toward said opening so as to unyieldingly wedge said locking bolt into a tight engagement with said bolt housing, said two slide members acting upon said bolt within two different planes extending substantially at a right angle to each other to thereby prevent said relative movement in both horizontal and vertical directions between said bolt and bolt housing when said door is closed, said locking bolt having a recess disposed so as to form a lateral projection intermediate one end of said recess and the front end of said bolt, said locking means comprising a latch pivotally secured to said lock casing and forming a two-armed lever, said latch having two projecting end portions at one arm thereof and spaced from each other to form a recess of a width substantially corresponding to the width of said projection on said bolt, one of said projecting end portions forming a feeler member and the other end portion forming a catch member, resilient means acting upon the other arm of said latch tending to pivot said latch so that said feeler member projects into said bolt housing whereby, when said door is being closed and said bolt passed into said bolt housing, the front end of the bolt will engage with said feeler member and thereby pivot said latch against the action of said last-mentioned resilient means whereby said catch member is moved into said bolt housing and engages into said last-mentioned recess in said bolt, while said lateral projection on said bolt engages into said last-mentioned recess between said feeler and catch members, a spring-actuated pawl adapted to engage with said other arm of said latch to lock said latch against pivotal movement at least when said bolt is fully inserted into said bolt housing and said door is fully closed, and means for disengaging said pawl from said latch to permit said door to be opened.

References Cited in the file of this patent

UNITED STATES PATENTS

| | | |
|---|---|---|
| 1,878,248 | Moore | Sept. 20, 1932 |
| 2,100,591 | Haberstump | Nov. 30, 1937 |
| 2,272,167 | Cloutier et al. | Feb. 10, 1942 |
| 2,634,147 | Roberston | Apr. 7, 1953 |
| 2,723,146 | Dingman et al. | Nov. 8, 1955 |